US012123639B2

(12) United States Patent
Wang et al.

(10) Patent No.: US 12,123,639 B2
(45) Date of Patent: Oct. 22, 2024

(54) REFRIGERATOR DOOR WITH REPLACEABLE DOOR PANEL

(71) Applicants: CHONGQING HAIER REFRIGERATION ELECTRIC APPLIANCE CO., LTD., Chongqing (CN); QINGDAO HAIER REFRIGERATOR CO., LTD., Qingdao (CN); HAIER SMART HOME CO., LTD., Qingdao (CN)

(72) Inventors: Wenchun Wang, Qingdao (CN); Hao Zhang, Qingdao (CN); Peng Lv, Qingdao (CN); Zhiwei Ren, Qingdao (CN)

(73) Assignees: CHONGQING HAIER REFRIGERATION ELECTRIC APPLIANCE CO., LTD., Chongqing (CN); QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 83 days.

(21) Appl. No.: 18/013,238

(22) PCT Filed: Jun. 18, 2021

(86) PCT No.: PCT/CN2021/100881
§ 371 (c)(1),
(2) Date: Dec. 27, 2022

(87) PCT Pub. No.: WO2022/001698
PCT Pub. Date: Jan. 6, 2022

(65) Prior Publication Data
US 2023/0280084 A1 Sep. 7, 2023

(30) Foreign Application Priority Data
Jun. 30, 2020 (CN) ......................... 202010621777.5

(51) Int. Cl.
*F25D 23/02* (2006.01)
*E05B 65/00* (2006.01)

(52) U.S. Cl.
CPC ........ *F25D 23/028* (2013.01); *E05B 65/0042* (2013.01); *F25D 2400/18* (2013.01)

(58) Field of Classification Search
CPC ........... E06B 3/7001; E06B 2003/7011; E06B 2003/7049; F25D 2400/18; F25D 23/028;
(Continued)

(56) References Cited

U.S. PATENT DOCUMENTS 11,988,438 B2 * 5/2024 Wang ...................... F25D 23/02
2002/0096978 A1 * 7/2002 Hightower ............. A47B 47/05 312/204
(Continued)

FOREIGN PATENT DOCUMENTS

CN 2447706 Y 9/2001
CN 102691983 A 9/2012
(Continued)

*Primary Examiner* — Hiwot E Tefera
(74) *Attorney, Agent, or Firm* — Cheng-Ju Chiang

(57) ABSTRACT

The present invention provides a refrigerator door with a replaceable door panel, comprising: a door body and a decorative door panel detachably connected to the door body; a rotary latch and a limiting member are disposed on the door body; a rear side of the decorative door panel facing towards the door body comprises a second limiting member and a lock post wherein when the decorative door panel is assembled on a front side of the door body, the rotary latch and the lock post snap-fit each other to limit a displacement of the decorative door panel in an up-down direction; the first limiting member cooperates with the second limiting member to limit a displacement of the decorative door panel in a front-rear direction.

11 Claims, 10 Drawing Sheets

(58) Field of Classification Search
CPC ............... E05B 1/0015; E05B 65/0042; A47B 2096/208; A47L 15/4265; F24C 15/06; E04F 19/083
USPC ........................................................ 312/265.6
See application file for complete search history.

(56) References Cited

U.S. PATENT DOCUMENTS

| | | | | |
|---|---|---|---|---|
| 2003/0067254 | A1* | 4/2003 | Manke | A47L 15/4265 312/265.6 |
| 2007/0086151 | A1 | 4/2007 | Oh et al. | |
| 2007/0188059 | A1* | 8/2007 | Davis | F24C 15/045 312/265.6 |
| 2008/0223085 | A1* | 9/2008 | Park | D06F 39/14 220/376 |
| 2012/0169196 | A1* | 7/2012 | Marchetti | E06B 5/006 312/265.6 |
| 2014/0077679 | A1* | 3/2014 | Lee | F25D 25/025 312/404 |
| 2016/0145917 | A1* | 5/2016 | Kim | E05C 19/02 312/405 |
| 2017/0101807 | A1* | 4/2017 | Huang | E05B 17/186 |
| 2017/0356685 | A1* | 12/2017 | Jung | E05D 11/1014 |
| 2020/0326119 | A1* | 10/2020 | Lee | F25D 23/028 |
| 2021/0396456 | A1* | 12/2021 | Park | F25D 23/028 |
| 2022/0290910 | A1* | 9/2022 | Wang | F25D 29/005 |
| 2023/0280086 | A1* | 9/2023 | Park | F24C 15/02 312/405 |

FOREIGN PATENT DOCUMENTS

| | | | |
|---|---|---|---|
| CN | 102980356 | A | 3/2013 |
| CN | 103499176 | A | 1/2014 |
| CN | 103791680 | A | 5/2014 |
| CN | 104329879 | A | 2/2015 |
| CN | 107677035 | A | 2/2018 |
| CN | 207763338 | U | 8/2018 |
| CN | 210119057 | U | 2/2020 |
| JP | H3-177776 | A | 8/1991 |
| WO | 2014/024429 | A1 | 2/2014 |

* cited by examiner

REFRIGERATOR DOOR WITH REPLACEABLE DOOR PANEL

CROSS REFERENCE TO RELATED APPLICATIONS

The present application is a 35 U.S.C. § 371 National Phase conversion of International (PCT) Patent Application No. PCT/CN2021/100881, filed on Jun. 18, 2021, which claims the priority of Chinese Application No. 202010621777.5 filed on Jun. 30, 2020, the disclosure of which is incorporated by reference herein. The PCT International Patent Application was filed and published in Chinese.

TECHNICAL FIELD

The present invention relates to the technical field of household appliances, and particularly to a refrigerator door with a replaceable door panel.

BACKGROUND

Along with constant development of science and technology, a refrigerator has already become one of indispensable household appliances. In current application, as the user's demands increase, the refrigerator is also required to exist as a decoration in the household environment in addition to as a household appliance.

Currently, a service life of the refrigerator may usually be in a range of 8 years to 10 years. During use of the refrigerator by the user, the appearance of the refrigerator once bought cannot satisfy the user's demands for long-term adjustment as the environment and scenario change. If the whole door body of the refrigerator is replaced, the cost of replacing the door body to achieve the changes in the appearance of the refrigerator is high, and the use of the refrigerator is affected, which is not conducive in satisfying the consumer's demands.

SUMMARY

An object of the present invention is to provide a refrigerator door with a replaceable door panel, wherein a door body and a decorative door panel of the refrigerator door are detachably connected to achieve quick mounting and quick detachment of the decorative door panel.

In order to achieve one of the above object, an embodiment of the present invention provides a refrigerator door with a replaceable door panel, wherein the refrigerator door comprise:

- a door body and a decorative door panel detachably connected to the door body;
- a rotary latch and a first limiting member are disposed on the door body;
- a rear side of the decorative door panel facing towards the door body comprises a second limiting member and a lock post;
- wherein when the decorative door panel is assembled on a front side of the door body, the rotary latch and the lock post snap-fit each other to limit a displacement of the decorative door panel in an up-down direction; the first limiting member cooperates with the second limiting member to limit a displacement of the decorative door panel in a front-rear direction.

As an optional embodiment, wherein the rotary latch comprises a pivoting member, and a locking hook and a snap disposed at opposite ends of the pivoting member, wherein when the pivoting member pivots to a first position, the locking hook snap-fits with the lock post, and the snap snap-fits with a side of the door body.

As an optional embodiment, wherein when the rotary latch turns to a second position, the snap disengages from the side of the door body, and the lock post disengages from the locking hook.

As an optional embodiment, wherein a rear platform is disposed on a side of the door body, the pivoting member is pivotally connected to the front side of the rear platform, the rear platform comprises a notch, wherein when the pivoting member pivots to the first position, the snap snap-fits with the notch.

As an optional embodiment, wherein the pivoting member comprises a holding portion which is disposed between the pivoting member and the snap, the snap is a snap arm, a gap is formed between the snap arm and the holding portion, a side surface of the snap arm away from the holding portion comprises a snap lug, wherein when the snap snap-fits with the notch, the snap lug passes through the notch and presses against the rear platform.

As an optional embodiment, wherein the locking hook is an opening formed on the pivoting member, an elastic arm is disposed in the opening, the elastic arm divides the opening into a snap-fitting area and a deformation area, wherein when the pivoting member turns to the first position, the snap-fitting area snap-fits the lock post.

As an optional embodiment, wherein the rotary latch further comprises a locking hook cover which is disposed on a front side of the pivoting member, the locking hook cover is provided with a receiving slot, wherein when the decorative door panel is assembled on the front side of the door body, the lock post is received in the receiving slot, and a rear end of the lock post protrudes from the receiving slot and is caught by the locking hook.

As an optional embodiment, wherein the receiving slot is a runway slot.

As an optional embodiment, wherein a front platform is disposed on the rear side of the decorative door panel, the front platform protrudes towards the door body, the front platform is provided with a raised column which has a cavity, a positioning lug is disposed on the rear platform, wherein the decorative door panel is assembled on the front side of the door body, and the positioning lug enters the cavity to limit a displacement of the decorative door panel in a left-right direction.

As an optional embodiment, wherein a frame is disposed on the rear side of the decorative door panel, the frame is attached to the decorative door panel, a second limiting member is disposed on an upper side of the frame, the post is disposed on a lower side of the frame, wherein the limiting member is a hook.

As an optional embodiment, wherein a hook groove is disposed on the front side of the door body, a first limiting member is disposed in the hook groove, and the first limiting member comprises an elastic pushing portion, wherein the hook enters the hook groove, and the elastic pushing portion pushes the hook rearward.

As compared with the prior art, the present invention provides a refrigerator door with a replaceable door panel. The rotary latch on the front side of the door body rotates and snap-fits with the lock post on the rear side of the decorative door panel, so that the displacement of the decorative door panel in the up-down direction is limited; the limiting member on the front side of the door body pushes backward the other limiting member on the rear side of the decorative door panel, so that the displacement of the decorative door panel in the front-rear direction is limited, thereby achieving the quick assembling of the decorative door panel and the door body. After the rotary latch pivots reversely, the limitation of the decorative door panel and the door body in the up-down direction may be quickly released, the limitation of the door body and the decorative door panel in the front-rear direction may be released by pushing the decorative door panel to move up, thereby achieving quick detachment.

In addition, during the mounting and detachment of the door body and the decorative door panel, screws are not used for fixation, and instead, simple snap-fitting structures are used, so that the assembling between the decorative door panel and the door body is more stable and meanwhile the detachment is simpler and more convenient.

DETAILED DESCRIPTION

Figure 1:
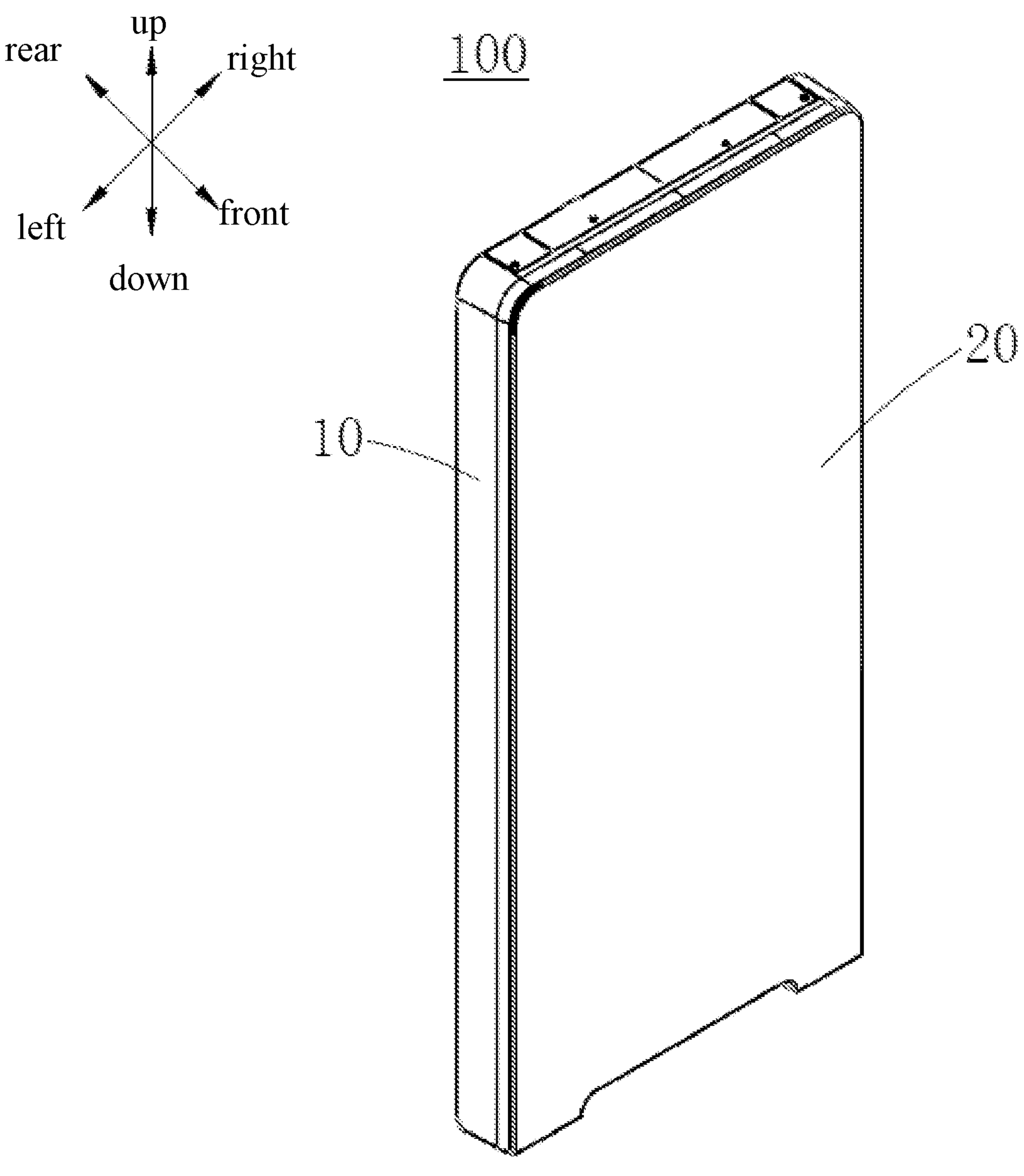
FIG. 1 is a view of a refrigerator door with a replaceable door panel according to the present invention.
Figure 2:
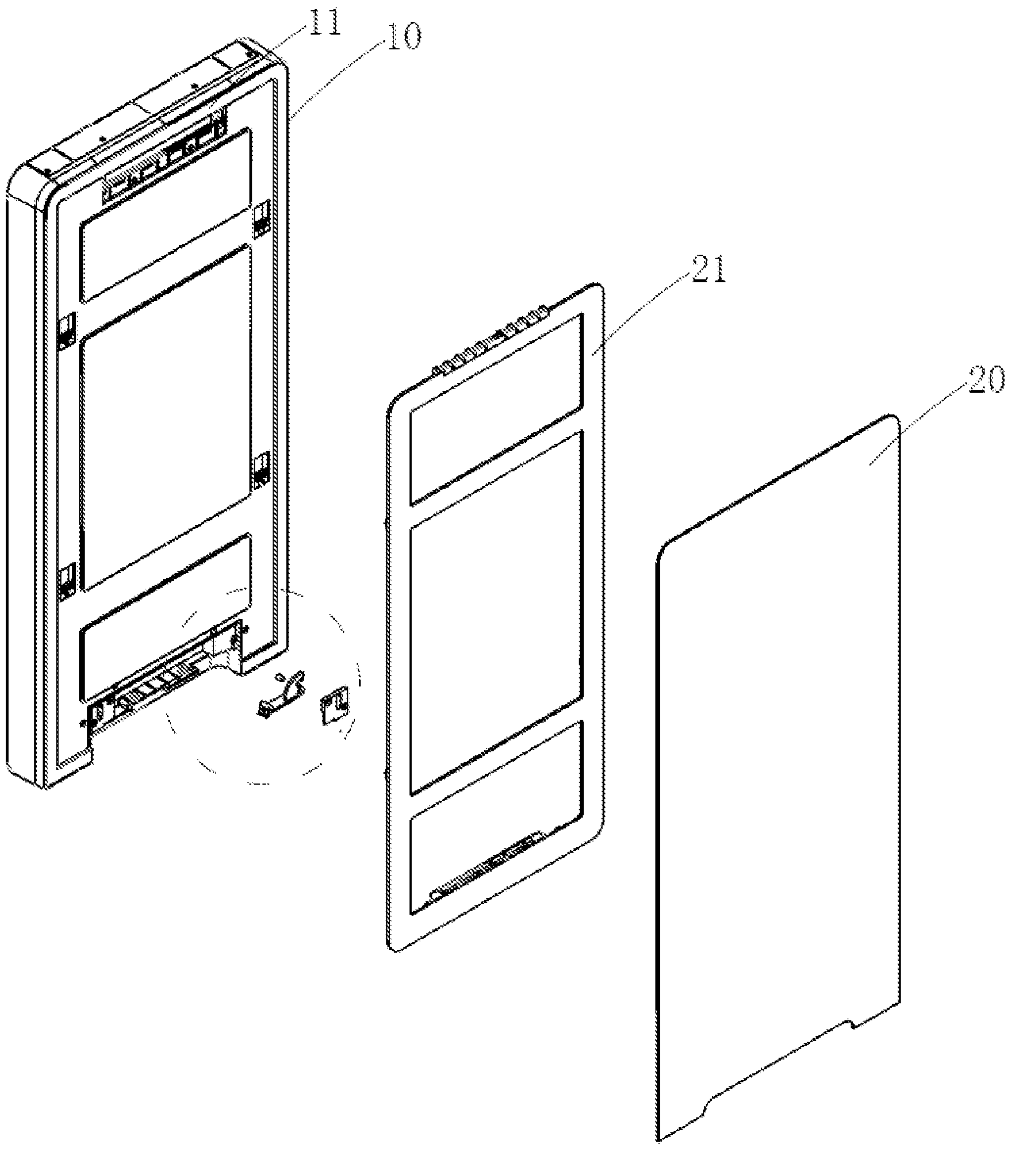
FIG. 2 and FIG. 3 are exploded views of the refrigerator door with a replaceable door panel in FIG. 1 as viewed from different angles of view.
Figure 3:
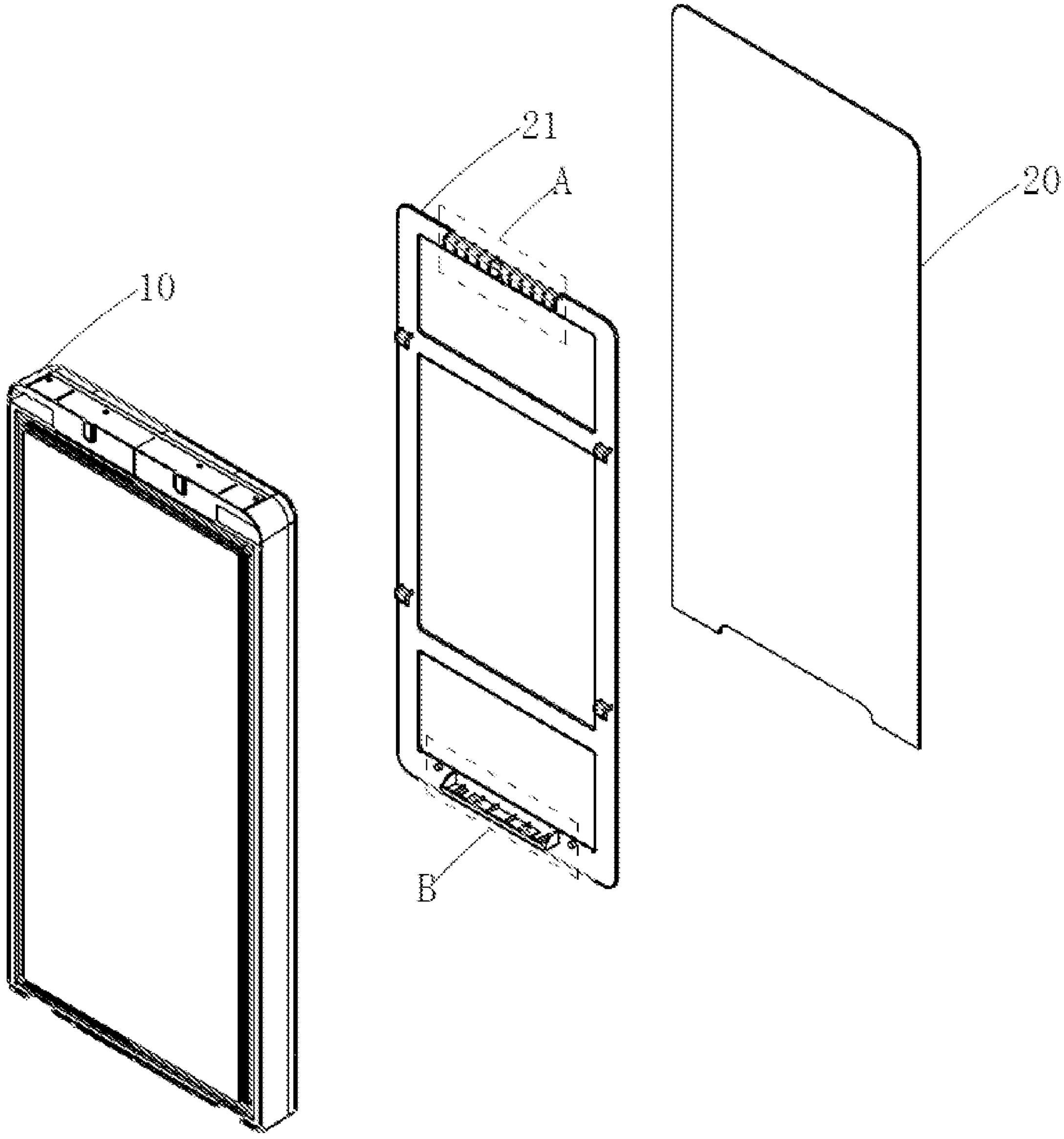

The present invention will be described in detail below in combination with embodiments shown in the figures. However, these embodiments do not limit the present invention, and structural or functional changes made by those having ordinary skill in the art according to these embodiments are all included in the protection scope of the present invention.

As shown in FIG. 1 through FIG. 7, a refrigerator door 100 with a replaceable door panel comprises: a door body 10, and a decorative door panel 20 detachably connected to the door body 10; a rotary latch and a first limiting member 14 are disposed on a front side of the door body 10; a lock post 23 and a second limiting member 24 are disposed on a rear side of the decorative door panel 20 facing towards the door body 10; when the decorative door panel 20 is assembled on the front side of the door body 10, the rotary latch and the lock post 23 snap-fit each other, thereby limiting a displacement of the decorative door panel 20 in an up-down direction; the second limiting member 24 cooperates with the first limiting member 14 to limit a displacement of the decorative door panel 20 in a front-rear direction.

The rotary latch comprises a pivoting member 30, and a snap 31 and a locking hook 32 are disposed at opposite ends of the pivoting member 30, wherein a pivoting hole 301 is disposed on the pivoting member 30, one end of a rotating shaft is for example fixed on one side of the door body 10, the other end of the rotating shaft 40 is inserted into the pivoting hole 301, and the pivoting member 30 pivots around the rotating shaft 40; when the pivoting member 30 pivots to a first position, the snap 31 snap-fits with one side of the door body 10, and the locking hook 32 snap-fits with the lock post 23 on the rear side the decorative door panel 20; when the pivoting member 30 pivots to a second position, the snap-fitting of the snap 31 and the door body 10 is released, and the lock post 23 disengages from the locking hook 32.

A rear platform 12 is disposed on the front side of the door body 10. The rear platform 12 is for example formed on a peripheral trim strip of the door body and extends towards the decorative door panel 20. A front end of the rear platform 12 is slightly lower than the front side of the door body 10 and makes proper space for engagement with the decorative door panel 20 so that the decorative door panel 20 may be tightly attached to the front side of the door body 10.

In the present embodiment, a fixing block 123 is disposed at a corner of the rear platform 12. One end of the rotating shaft 40 is fixed on the fixing block 123, and the other end of the rotating shaft 40 protrudes from the fixing block 123 and mates with the pivoting hole 301 of the pivoting member 30. The pivoting member 30 is pivotally engaged at the front side of the fixing block 123.

Figure 4:
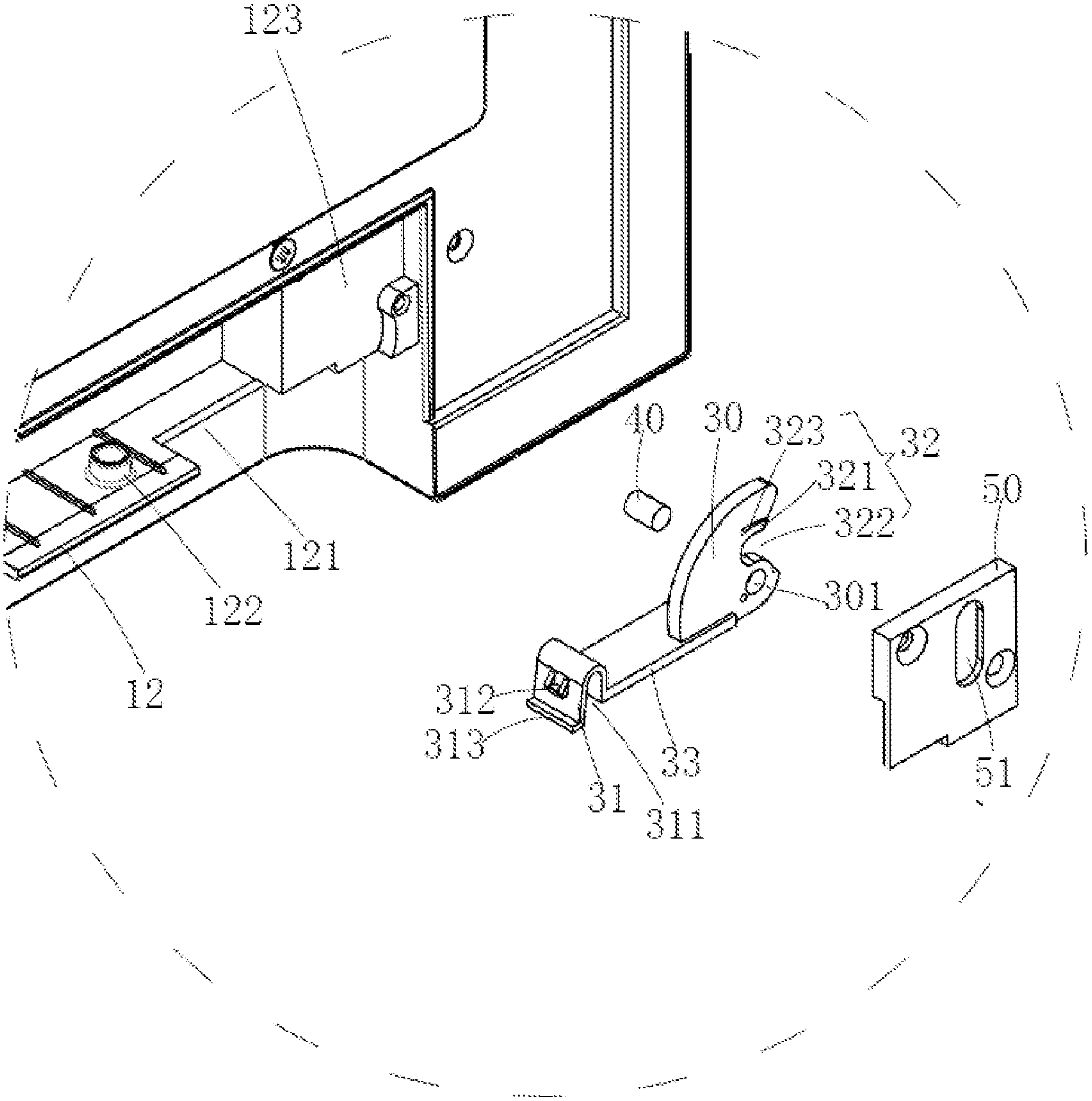
FIG. 4 is an enlarged view of a dashed region in FIG. 2.
Figure 5:
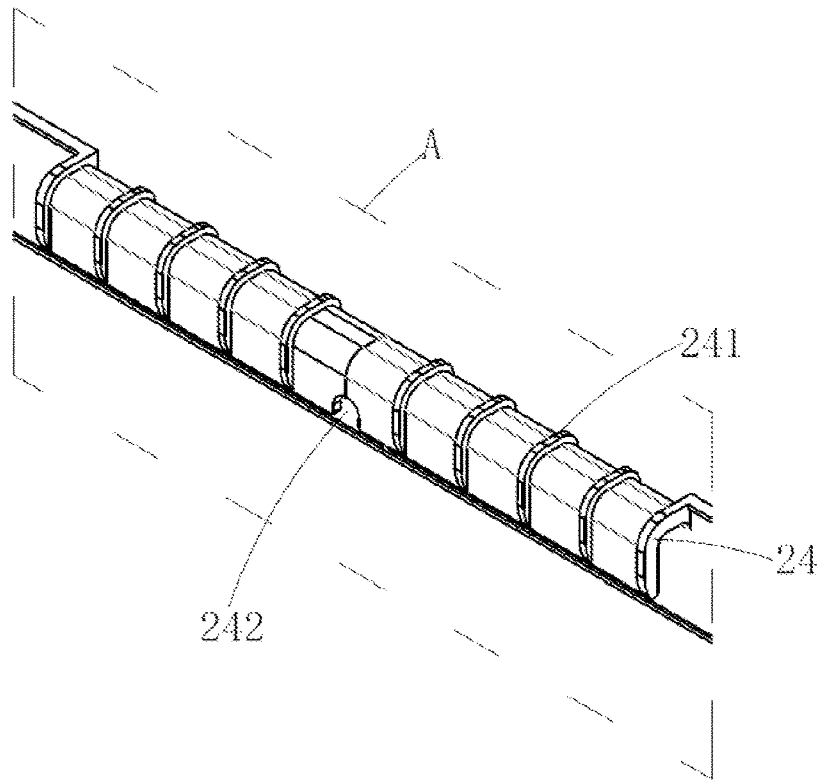
FIG. 5 is an enlarged view of a dashed region A in FIG. 3.
Figure 8A:
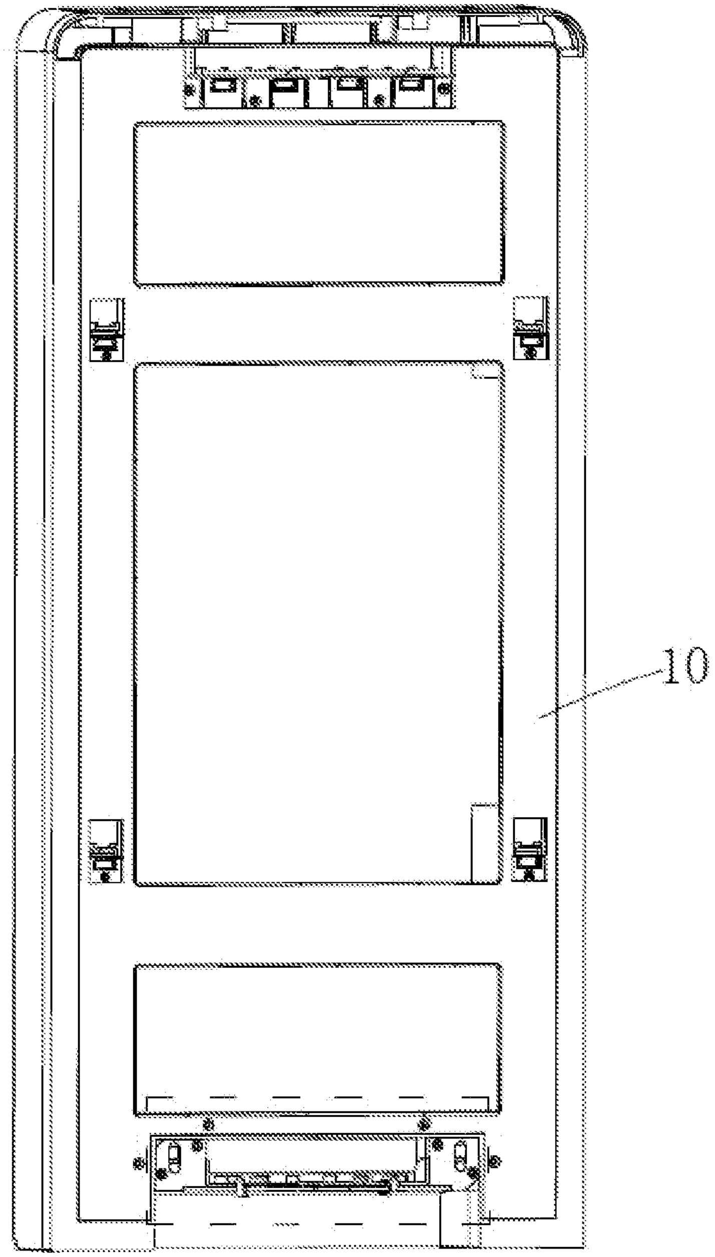
FIG. 8A is a cross-sectional view of a door body with a replaceable door panel when the rotary latch is at a first position as viewed from front.
Figure 8B:
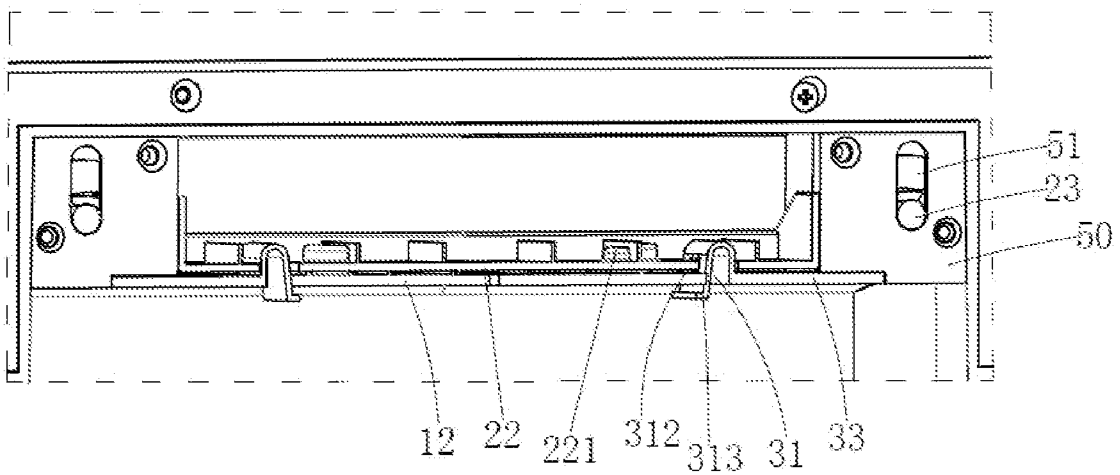
FIG. 8B is an enlarged view of a dashed region in FIG. 8A.
Figure 9A:
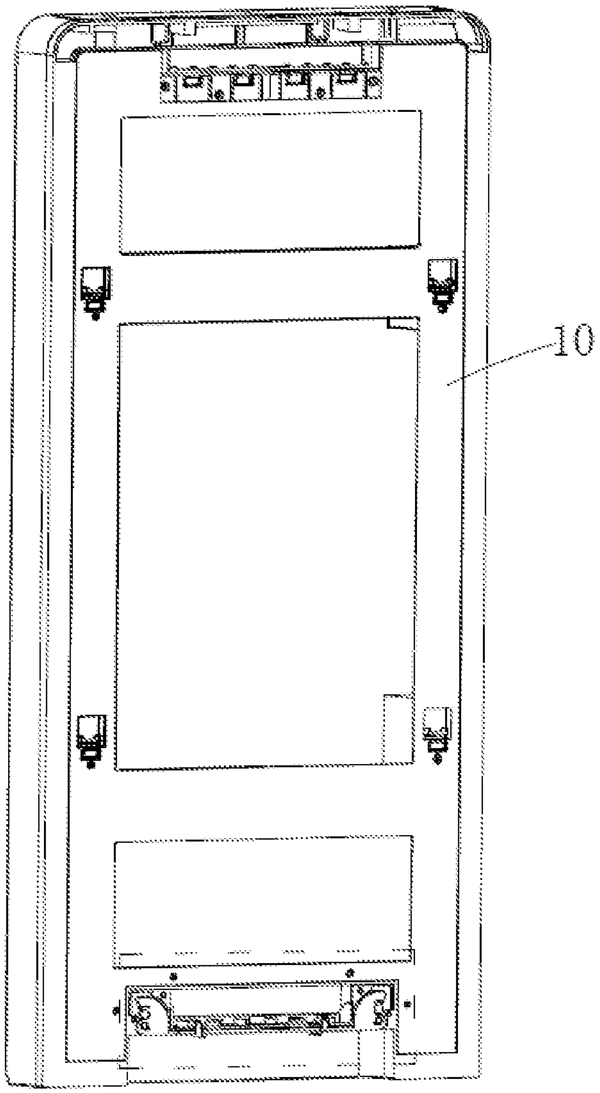
FIG. 9A is another cross-sectional view of a door body with a replaceable door panel when the rotary latch is at the first position as viewed from front.
Figure 9B:
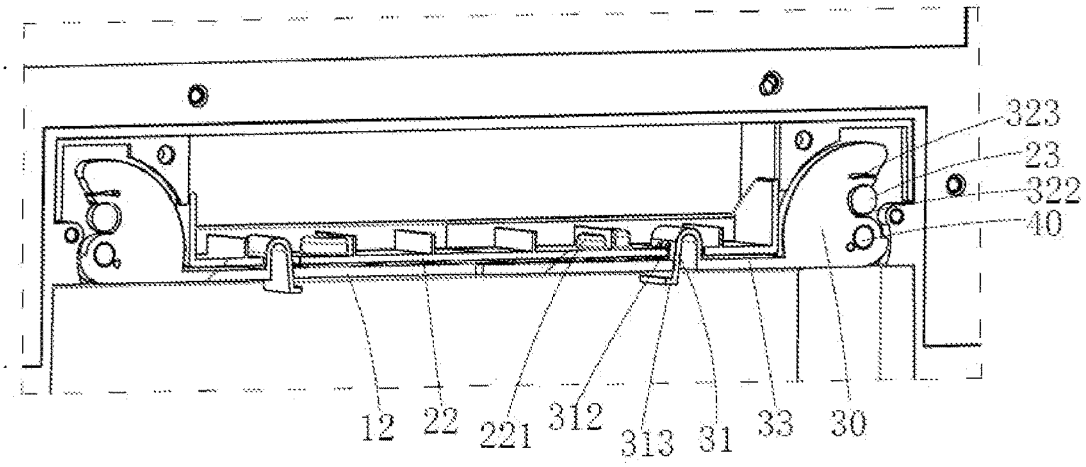
FIG. 9B is an enlarged view of a dashed region in FIG. 9A.

As shown in FIG. 4, FIG. 8B and FIG. 9B, a notch 121 is disposed on the rear platform 12. When the pivoting member 30 pivots to the first position, the snap 31 of the pivoting member 30 passes through the notch 121 and snap-fits with the rear platform 12.

The pivoting member 30 further comprises a holding portion 33 which is located between the pivoting member 30 and the snap 31. The snap 31 is for example a snap arm, which is formed at an end of the holding portion 33, and a gap 311 is formed between the snap arm and an end of the holding portion 33. A side surface of the snap arm away from the holding portion 33 comprises a snap lug 312 and a stopper 313.

When the pivoting member 30 pivots to the first position, the holding portion 33 enters the notch 121, a lateral side of the notch 121 of the rear platform 12 squeezes the snap arm and the snap lug 131, and the gap 311 provides a deformation space for the snap arm. After the snap lug 312 on the snap arm goes beyond the lateral side of the notch 121 of the rear platform 12, a movement tendency of the snap arm in the up-down direction is stopped by the stopper 313 below the snap lug 312. At this time, a rebound force after the snap arm is squeezed is used, the lateral side of the notch 121 of the rear platform 12 snap-fits between the snap lug 312 and the stopper 313, that is, the snap lug 312 passes through the notch 121 and presses against the lateral side of the notch 121 of the rear platform 12 under the action of the rebound force of the snap arm.

In the present embodiment, the snap arm is for example an arched arm or an arched arm structure.

As shown in FIG. 4, FIG. 8B and FIG. 9B, the locking hook 32 is an opening formed on the pivoting member 30. An elastic arm 321 is disposed in the opening. The elastic arm 321 divides the opening into a snap-fitting area 322 and a deformation area 323. A size of the opening of the snap-fitting area 322 is smaller than the diameter of the lock post 23. When the snap-fitting area 322 snap-fits with the lock post 23, the lock post 23 squeezes the elastic arm 321, the elastic arm 321 moves towards the deformation area 323, the opening expands, and the lock post 23 snap-fits in the snap-fitting area 322, and a rebound force provided by the elastic arm 321 makes the size of the opening of the snap-fitting area 322 reduced, thereby preventing the lock post 23 from disengaging from the snap-fitting area 322. When the lock post 23 disengages from the snap-fitting area 322, and the lock post 23 squeezes the elastic arm 321, so that the opening of the snap-fitting area 322 is expanded, and the lock post 23 disengages from the opening.

In the present embodiment, the snap 31 and the locking hook 32 are respectively formed at opposite left and right ends of the pivoting member 30. The holding portion 33 is disposed between the left end of the pivoting member 30 and the snap 31. The holding portion 33 is turned so that the pivoting member 30 pivots, the snap 31 snap-fits with the rear platform 12 on a side of the door body 10, and the locking hook 32 snap-fits with the lock post 23 on the rear side of the decorative door panel 20.

Figure 7:
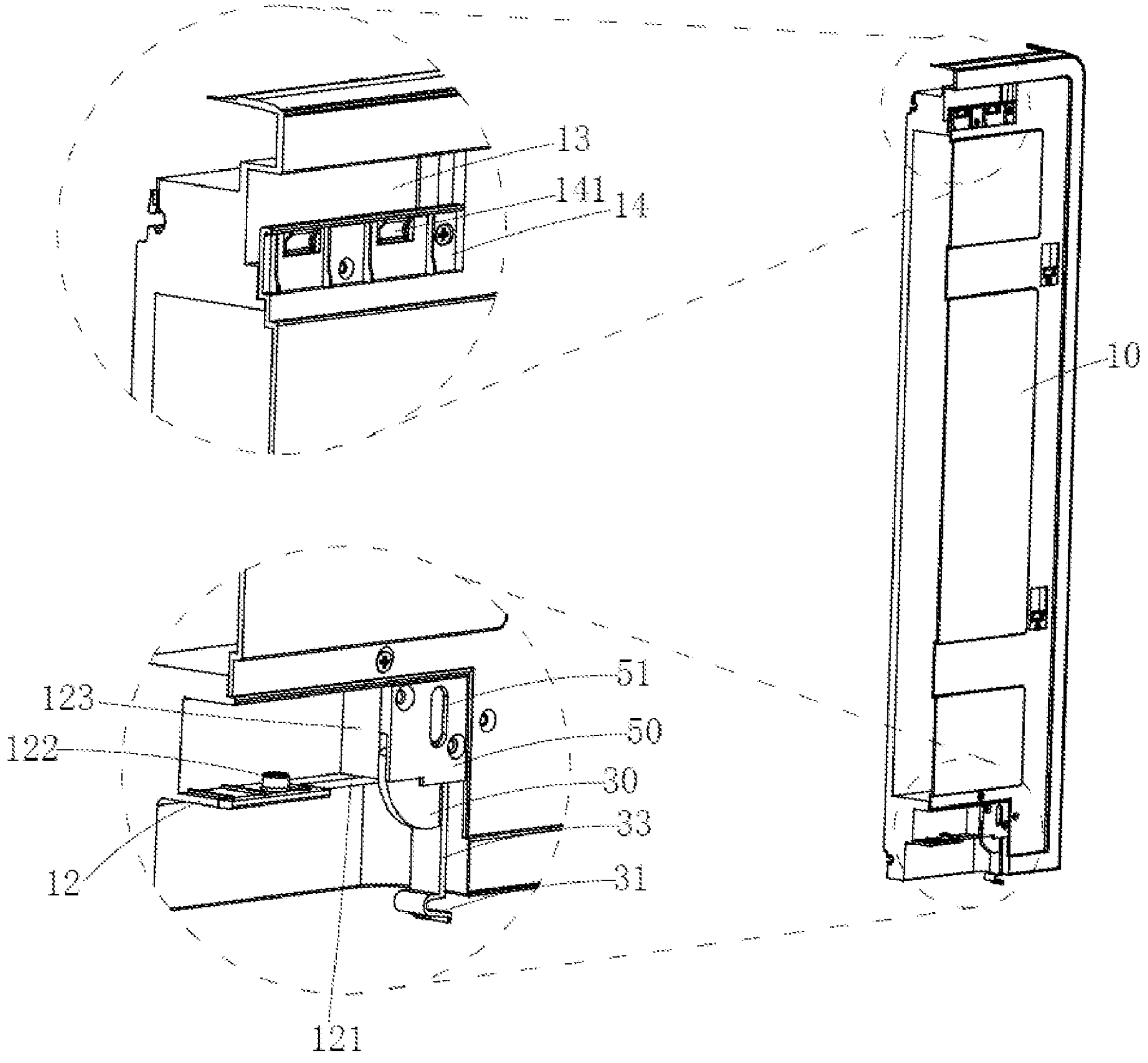
FIG. 7 is a cross-sectional view of a door body when a rotary latch is at a second position.

As shown in FIG. 4, FIG. 7 and FIG. 8B, the rotary latch further comprises a locking hook cover 50 which is disposed at a front side of the pivoting member 30, between the decorative door panel 20 and the door body 10, and is locked on the door body 10. In the front-rear direction, a front side of the locking hook cover 50 is slightly lower than the front side of the door body 10. The locking hook cover 50 may be locked on a front side of the fixing block 123 at the corner of the rear platform 12.

In the present embodiment, the locking hook cover 50 is provided with a receiving slot 51 which is a runway slot. When the decorative door panel 20 is assembled on the front side of the door body 10, the lock post 23 on the rear side of the decorative door panel 20 is received in the receiving slot, and the rear end of the lock post 23 protrudes from the receiving slot 51 and is caught by the locking hook 32.

As shown in FIG. 3, FIG. 5, FIG. 6 and FIG. 10, a frame 21 is disposed on the rear side of the decorative door panel 20, a front platform 22 protrudes from the frame 2 towards the door body 10, the front platform 22 and the rear platform 12 extend opposite to each other, and the front platform 22 is provided with a raised column 221 which has a cavity 222.

The front platform 22 may be regarded as a front handle formed on the rear side of the decorative door panel 20, and the rear platform 12 may be regarded as a rear handle formed on the front side of the door body 10. When the decorative door panel 20 is assembled on the front side of the door body 10, the front platform 22 and the rear platform 12 are superposed with each other or the front handle and the rear handle are superposed with each other, and are hidden between the door body 10 and the decorative door panel 20. Therefore, the front platform 22 and the rear platform 12 may be regarded as forming a hidden handle structure of the refrigerator door 100 with the replaceable door panel.

Figure 6:
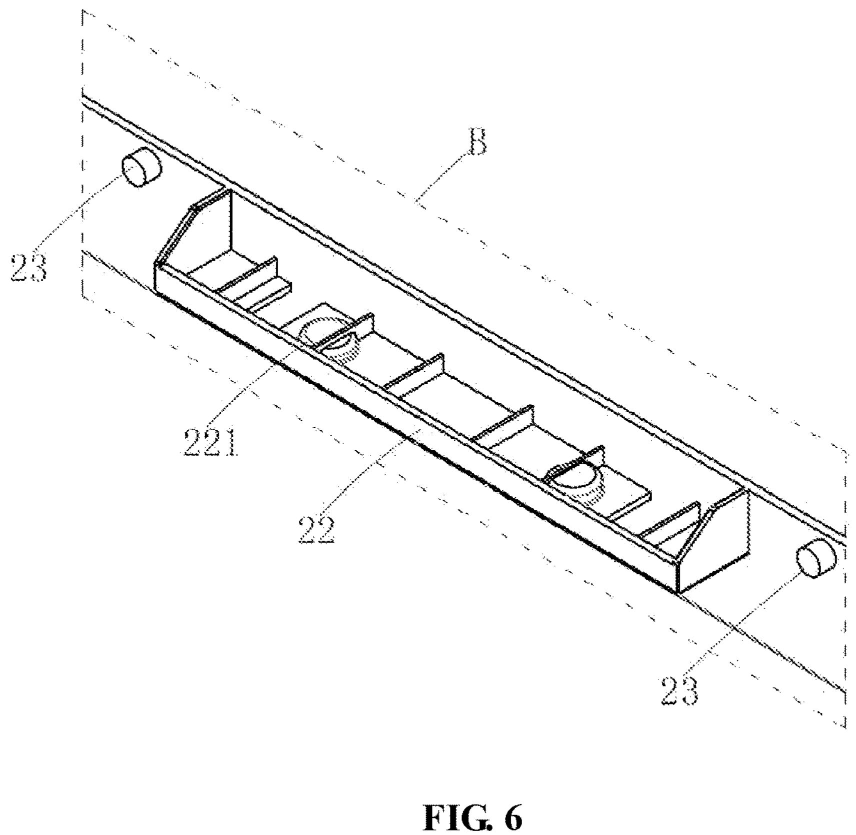
FIG. 6 is an enlarged view of a dashed region B in FIG. 3.

As shown in FIG. 6, the lock post 23 is formed on the frame 21 and protrudes toward the door body 10. In the present embodiment, the lock post 23 is disposed adjacent left and right sides of the front platform 22. Preferably, the lock post 23, the front platform 22 and the frame 21 are integrally formed, attached to the rear side of the decorative door panel 20, and integrated with the decorative door panel 20 to facilitate quick detachment and quick mounting when the decorative door panel 20 is replaced.

Figure 10:
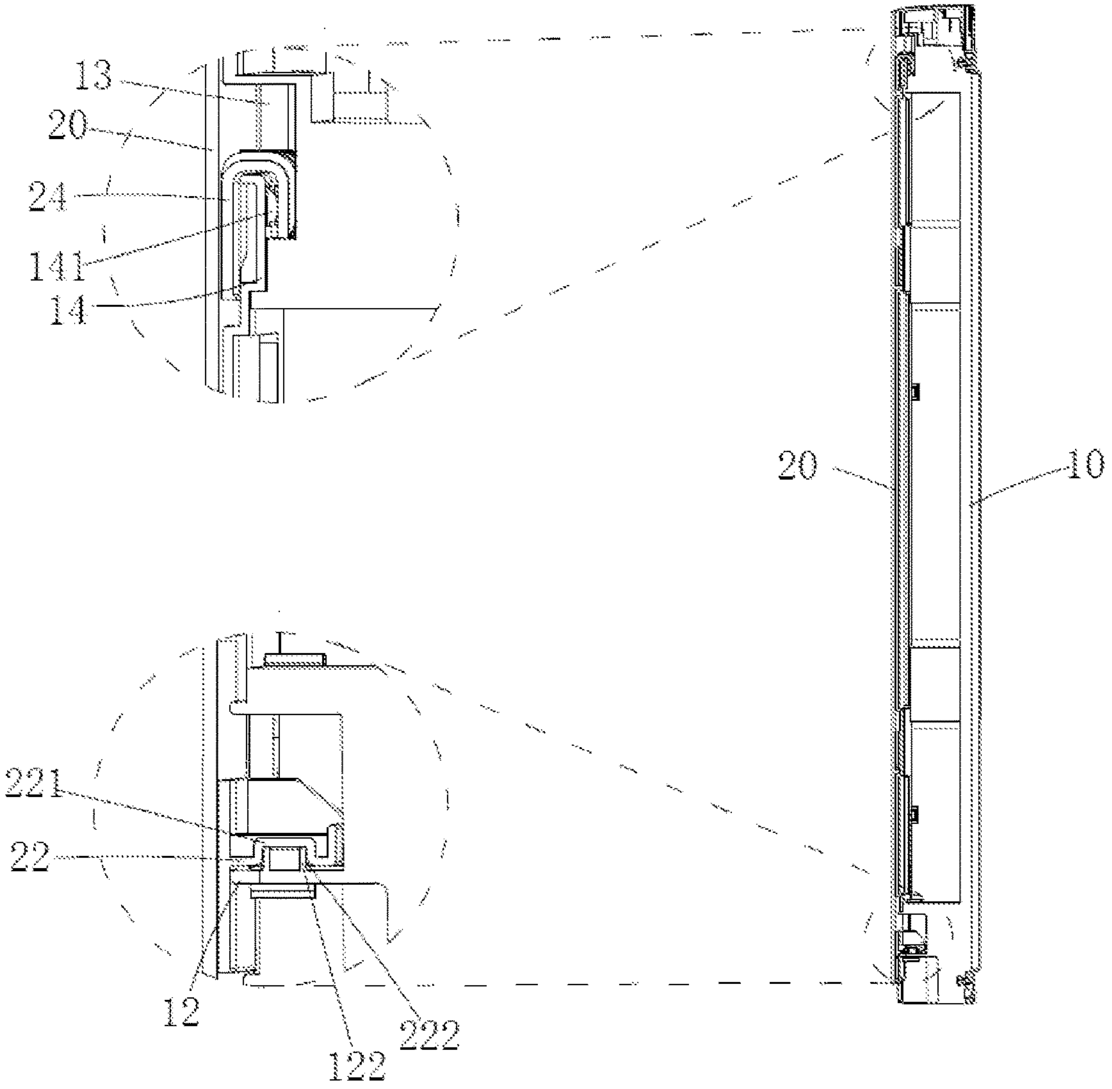
FIG. 10 is a cross-sectional view of a door body with a replaceable door panel when the rotary latch is at the second position as viewed from a side.

As shown in FIG. 10, when the decorative door panel 20 of the integrated frame 21 is assembled on the front side of the door body 10, the front platform 22 overlaps a side of the rear platform 12 in the up-down direction. In the present embodiment, the front platform 22 overlaps or is superposed on an upper side of the rear platform 12. A positioning lug 122 on the rear platform 12 is inserted into the cavity 222 of the raised column 221 of the front platform 22, and the displacement of the decorative door panel 20 in the left-right direction is limited.

As shown in FIG. 6, FIG. 7 and FIG. 10, a hook groove 13 is disposed on the front side of the door body 10, a first limiting member 14 is disposed in the hook groove 13, and an elastic pushing portion 141 is disposed on a rear side of the first limiting member 14; a second limiting member 24 is disposed on the upper side of the frame 21, the second limiting member 24 is a hook, and the second limiting member 24 is disposed opposite to the lock post 23 and the front platform 22; when the hook enters the hook groove 13 and falls into the bottom of the hook groove 13, the elastic pushing portion 141 pushes the hook backward elastically in the front-rear direction, so that the decorative door panel 20 moves backward and fits on the front side of the door body 10. There is no gap between the door body 10 and the decorative door panel 20, which increases the aesthetics of the refrigerator door 100 with the replaceable door panel.

In the present embodiment, one end of the elastic pushing portion 141 is connected with a body 142 of the first limiting member 14, and the other end of the elastic pushing portion 141 extends obliquely downward toward the interior of the hook groove 13. The elastic pushing portion 141 extending obliquely downward may also guide the hook (the second limiting member 24) to slide toward the bottom of the hook groove 13, thereby improving the convenience in assembling the hook (the second limiting member 24).

In addition, a hook insertion port of the hook groove 13 is opposite to the decorative door panel 20, a limiting projection is disposed on a rear groove wall of the hook groove 13, the rear groove wall is opposite to the hook insertion port, the hook (the second limiting member 24) is provided with a limiting hole 242 corresponding to the limiting projection, and the limiting hole 242 mates with the limiting projection, thereby limiting the hook (the second limiting member 24) from moving in the hook groove 13 in the left-right direction and thereby limiting the displacement of the decorative door panel 20 in the left-right direction.

In addition, the hook further comprises a plurality of reinforcing ribs 241, which are used to improve a load-bearing capacity of the hook and the stability of the decorative door panel 20 after assembling.

As known from FIG. 1 through FIG. 10, a process of assembling the refrigerator 100 with the replaceable door panel is as follows:

In the up-down direction, first, the hook (the second limiting member 24) on the upper side of the frame 21 on the rear side of the decorative door panel 20 is inserted into the hook groove 13, and the lock post 23 on the lower side of the frame 21 enters the receiving slot 51 of the locking hook cover 50; next, the decorative door panel 20 is moved downward, the hook (the second limiting member 24) falls into the bottom of the hook groove 13, and is pushed backward by the elastic pushing portion 141 of the first limiting member 14; as the hook (the second limiting member 24) moves towards the bottom of the hook groove 13, the lock post 23 slides down along the receiving slot 51 and slides to the bottom of the receiving slot 51. At this time, the rear platform 12 and the front platform 22 overlap each other, and the positioning lug 122 enters the cavity 222 of the raised column 221; then, the holding portion 33 on the pivoting member 30 is turned; when the pivoting member 30 is at the first position, the holding portion 33 is located in the notch 121 of the front platform 12 of the door body 10, the snap lug 312 of the snap 31 goes beyond the lateral side of the notch 121 and presses against the upper side of the front platform 12, and the snap-fitting area 322 of the locking hook 32 at the other end of the pivoting member 30 snap-fits with the lock post 23.

As known from FIG. 1 through FIG. 10, a process of detaching the refrigerator 100 with the replaceable door panel is as follows:

When the refrigerator door with the replaceable door panel needs to be detached, the holding portion 33 of the pivoting member 30 is turned in the opposite direction, the holding portion 33 drives the snap 31 to turn out of the notch 121, the snap 31 disengages from the front platform 12, the pivoting member 30 pivots in the opposite direction, and the lock post 23 disengages from the locking hook 32; then, the decorative door panel 20 is pushed upward in the up-down direction, the hook (the second limiting member 24) squeezes the first limiting member 14, moves upward in the hook groove 13, and disengages from the hook groove 13. At the same time, the positioning lug 122 disengages from the cavity 222 of the raised column 221, and the decorative door panel 20 is detached from the door body 10.

To conclude, the present invention provides a refrigerator door with a replaceable door surface. The rotary latch on the front side of the door body rotates and snap-fits with the lock post on the rear side of the decorative door panel, so that the displacement of the decorative door panel in the up-down direction is limited; the limiting member on the front side of the door body pushes backward the other limiting member on the rear side of the decorative door panel, so that the displacement of the decorative door panel in the front-rear direction is limited, thereby achieving the quick assembling of the decorative door panel and the door body. After the rotary latch pivots reversely, the limitation of the decorative door panel and the door body in the up-down direction may be quickly released, the limitation of the door body and the decorative door panel in the front-rear direction may be released by pushing the decorative door panel to move up, thereby achieving quick detachment.

In addition, during the mounting and detachment of the door body and the decorative door panel, screws are not used for fixation, and instead, simple snap-fitting structures are used, so that the assembling between the decorative door panel and the door body is more stable and meanwhile the detachment is simpler and more convenient.

It should be understood that although the description is described according to the embodiments, not every embodiment only comprises one independent technical solution, that such a description manner is only for the sake of clarity, that those skilled in the art should take the description as an integral part, and that the technical solutions in the embodiments may be suitably combined to form other embodiments understandable by those skilled in the art.

The detailed descriptions set forth above are merely specific illustrations of feasible embodiments of the present invention, and are not intended to limit the scope of protection of the present invention. All equivalent embodiments or modifications that do not depart from the art spirit of the present invention should fall within the scope of protection of the present invention.

What is claimed is:

1. A refrigerator door with a replaceable door panel, wherein the refrigerator door comprises:

a door body; and a decorative door panel detachably connected to the door body;

a rotary latch and a first limiting member are disposed on the door body;

a rear side of the decorative door panel facing towards the door body comprises a second limiting member and a lock post;

wherein when the decorative door panel is assembled on a front side of the door body, the rotary latch and the lock post snap-fit each other to limit a displacement of the decorative door panel in an up-down direction; the first limiting member cooperates with the second limiting member to limit a displacement of the decorative door panel in a front-rear direction;

wherein the rotary latch comprises a pivoting member, and a locking hook and a snap disposed at opposite ends of the pivoting member, wherein when the pivoting member pivots to a first position, the locking hook snap-fits with the lock post, and the snap snap-fits with a side of the door body.

2. The refrigerator door with a replaceable door panel according to claim 1, wherein when the rotary latch turns to a second position, the snap disengages from the side of the door body, and the lock post disengages from the locking hook.

3. The refrigerator door with a replaceable door panel according to claim 1, wherein a rear platform is disposed on a side of the door body, the pivoting member is pivotally connected to the front side of the rear platform, the rear platform comprises a notch, wherein when the pivoting member pivots to the first position, the snap snap-fits with the notch.

4. The refrigerator door with a replaceable door panel according to claim 3, wherein the pivoting member comprises a holding portion which is disposed between the pivoting member and the snap, the snap is a snap arm, a gap is formed between the snap arm and the holding portion, a side surface of the snap arm away from the holding portion comprises a snap lug, wherein when the snap snap-fits with the notch, the snap lug passes through the notch and presses against the rear platform.

5. The refrigerator door with a replaceable door panel according to claim 4, wherein the locking hook is an opening formed on the pivoting member, an elastic arm is disposed in the opening, the elastic arm divides the opening into a snap-fitting area and a deformation area, wherein when the pivoting member turns to the first position, the snap-fitting area snap-fits the lock post.

6. The refrigerator door with a replaceable door panel according to claim 3, wherein the rotary latch further comprises a locking hook cover which is disposed on a front side of the pivoting member, the locking hook cover is provided with a receiving slot, wherein when the decorative door panel is assembled on the front side of the door body, the lock post is received in the receiving slot, and a rear end of the lock post protrudes from the receiving slot and is caught by the locking hook.

7. The refrigerator door with a replaceable door panel according to claim 6, wherein the receiving slot is a runway slot.

8. The refrigerator door with a replaceable door panel according to claim 3, wherein a front platform is disposed on the rear side of the decorative door panel, the front platform protrudes towards the door body, the front platform is provided with a raised column which has a cavity, a positioning lug is disposed on the rear platform, wherein the decorative door panel is assembled on the front side of the door body, and the positioning lug enters the cavity to limit a displacement of the decorative door panel in a left-right direction.

9. The refrigerator door with a replaceable door panel according to claim 1, wherein a frame is disposed on the rear side of the decorative door panel, the frame is attached to the decorative door panel, the second limiting member is disposed on an upper side of the frame, the post is disposed on a lower side of the frame, wherein the second limiting member is a hook.

10. The refrigerator door with a replaceable door panel according to claim 9, wherein a hook groove is disposed on the front side of the door body, the first limiting member is disposed in the hook groove, and the first limiting member comprises an elastic pushing portion, wherein the hook enters the hook groove, and the elastic pushing portion pushes the hook rearward.

11. A refrigerator door with a replaceable door panel, wherein the refrigerator door comprises:

a door body; and a decorative door panel detachably connected to the door body;

a rotary latch and a first limiting member are disposed on the door body;

a rear side of the decorative door panel facing towards the door body comprises a second limiting member and a lock post;

wherein when the decorative door panel is assembled on a front side of the door body, the rotary latch and the lock post snap-fit each other to limit a displacement of the decorative door panel in an up-down direction; the first limiting member cooperates with the second limiting member to limit a displacement of the decorative door panel in a front-rear direction;

wherein a frame is disposed on the rear side of the decorative door panel, the frame is attached to the decorative door panel, the second limiting member is disposed on an upper side of the frame, the post is disposed on a lower side of the frame, wherein the second limiting member is a hook;

wherein a hook groove is disposed on the front side of the door body, the first limiting member is disposed in the hook groove, and the first limiting member comprises an elastic pushing portion, wherein the hook enters the hook groove, and the elastic pushing portion pushes the hook rearward.

* * * * *